United States Patent [19]

Graafmann

[11] 4,193,105

[45] Mar. 11, 1980

[54] PIPE WITH AN EXTERNAL SEALING BODY

[75] Inventor: Jürgen Graafmann, Ibbenbüren, Fed. Rep. of Germany

[73] Assignee: Wavin B.V., Zwolle, Netherlands

[21] Appl. No.: 797,864

[22] Filed: May 17, 1977

[30] Foreign Application Priority Data

May 21, 1976 [NL] Netherlands ............... 7605520
Nov. 26, 1976 [DE] Fed. Rep. of Germany ....... 2653698

[51] Int. Cl.² ............................ H05F 3/02
[52] U.S. Cl. ........................... 361/215; 174/47; 174/110 F
[58] Field of Search ............... 361/215; 174/110 F, 174/47; 264/46.9; 248/49, 54 R; 138/112–114; 299/2, 12; 166/141, 179, 191, 195

[56] References Cited

U.S. PATENT DOCUMENTS

| 2,890,724 | 6/1959 | Kennedy ............... 248/49 UX |
| 3,064,073 | 11/1962 | Downing et al. ........ 174/110 F |
| 3,359,351 | 12/1967 | Bender ................. 264/46.9 |
| 3,385,367 | 5/1968 | Kollsman ............... 166/191 |
| 3,394,207 | 7/1968 | Andersen .............. 264/46.9 X |
| 3,684,816 | 8/1972 | Reighter .............. 174/110 F X |
| 3,790,695 | 2/1974 | Floessel et al. ....... 174/110 F X |
| 3,943,273 | 3/1976 | de Putter ............. 361/215 X |
| 3,963,856 | 6/1976 | Carlson et al. ........ 361/215 X |
| 4,063,429 | 12/1977 | Wilson ................ 264/46.9 X |

FOREIGN PATENT DOCUMENTS

| 1096602 | 1/1961 | Fed. Rep. of Germany . |
| 1939989 | 2/1971 | Fed. Rep. of Germany . |
| 1950251 | 4/1971 | Fed. Rep. of Germany . |
| 1496265 | 9/1967 | France . |
| 1579406 | 8/1969 | France . |

*Primary Examiner*—Harry E. Moose, Jr.
*Attorney, Agent, or Firm*—Haseltine, Lake & Waters

[57] ABSTRACT

A plastic pipe of a thermoplastic material, such as polyvinylchloride provided on its outside with a resilient sealing body of a polyurethane foam plastic, which has been foamed onto said outside and a layer of thermosetting resin with electrically conducting particles being between said body and the plastic pipe in order to ensure a proper conduction, the foam plastic body having a closed surface being integral with the foam plastic body.

8 Claims, 5 Drawing Figures

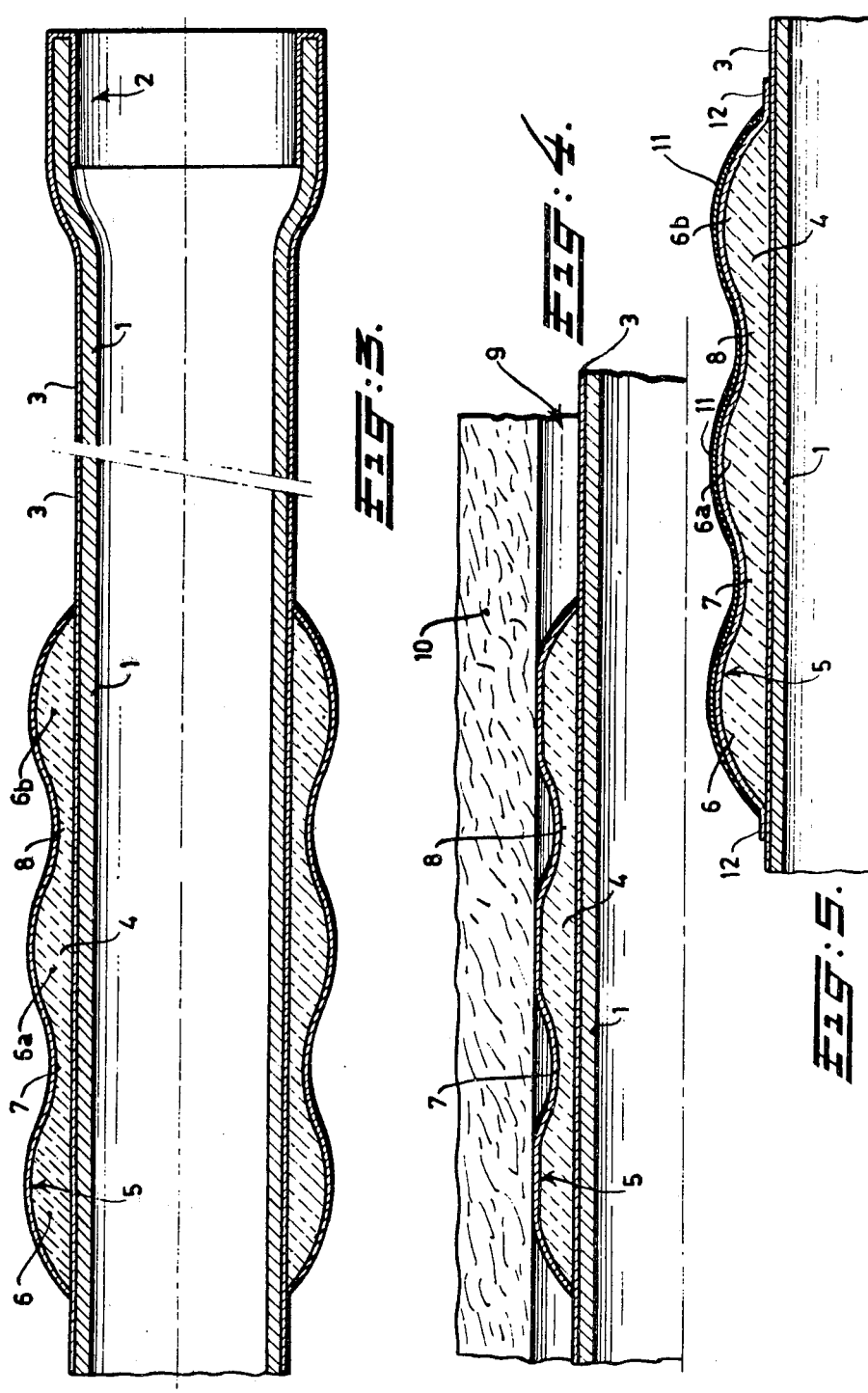

PIPE WITH AN EXTERNAL SEALING BODY

BACKGROUND OF THE INVENTION

The invention relates to a pipe with an external sealing body.

These known pipes are used in bore holes of coal stratums in mining industries for sucking off gases. In coal stratums presenting a high methane concentration, the methane should be sucked off in order to decrease the risks of explosion.

So as to obtain a reliable suction a pipe is pushed into each bore hole, while moreover the hollow space between the bore hole wall and the pipe is sealed. The pipes in the bores are connected with a mutual gas pipe line which in its turn is connected with a blower, providing the sub-atmospheric pressure required for removing the gases by suction.

The above mentioned sub-atmospheric pressure, however, not only improves a suction action with respect to methane gases, but also causes a reduced methane concentration in the gas mixture to be removed if air leaks toward the suction opening and thus a reduction of methane in the mixture removed by suction.

An efficient sealing should therefore be carried out, in order to avoid a suction action of the gas mixture from the mine proper and not from the coal stratums with methane concentrations.

Up to now a foam rubber body has been glued on known pipes, whereafter the body is covered with a resilient paste, acting as a sealing means, which structure is then covered with a resilient expandable wear resistant cover for obtaining a sealing body having a diameter which always exceeds the one of the bore hole in which the pipe is accommodated.

Such a sealing body has the drawback that it can only be provided with much work expenditure, whereas shifting of the same can also occur when a pipe is used with an insufficient glue connection between sealing body and pipe.

SUMMARY OF THE INVENTION

The present invention aims to provide a pipe which does not present the aforementioned disadvantages, the sealing body of same having optimal adhering properties to the pipe.

According to the invention this is achieved in that the external side of the pipe is at least provided with a foamed sealing body which has been foamed onto the pipe.

So as to obtain an electrical conduction, the sealing body may be provided with electrically conducting particles, for instance carbon particles in the form of conducting soot particles.

The resilient sealing body consists of a resilient foam, particularly a polyurethane foam, having a porefree surface, this foam body being foamed directly onto the plastic pipe and adhering to the same without the use of a glue to be applied to the inside of a foam body, while simultaneously this surface layer is absolutely wear proof. On using these sealing bodies a mold is arranged around the pipe whereafter the remaining free space of the mold is filled up by foaming with a plastic composition, particularly a polyurethane whereby the outside of the body is provided with a closed skin.

Such a sealing body, especially of polyurethane, presents the advantage that the covering layer is integral with the sealing body contrary to known sealing bodies in which a foam rubber body is glued upon the pipe; subsequently a resilient paste is applied to said foam rubber body; and finally a resilient expandable sleeve is stretched over and on the whole structure of the foam body.

Advantageously the foam plastic sealing body is applied to a plastic pipe and is connected with said plastic pipe through an electrically conducting resin layer, which consists of a thermosetting resin adhering to the plastic pipe.

Due to the properties of polyurethane material, an optimal adherence of the sealing body to the plastic pipe is obtained, when an electrically conducting surface layer of thermosetting resin is applied to a plastic pipe, thus causing properly reduced investment costs.

The plastic pipe, preferably a thermoplastic pipe and more particularly a polyvinylchloride pipe, is mostly provided with two resilient sealing bodies separated from each other and arranged near a free end region of the pipe.

In this way a very good sealing is produced and moreover a proper centering when a plastic pipe is pushed into a bore hole.

A preferred embodiment of the sealing body has a longitudinal shape and is accommodated on the external side of the pipe, which sealing body presents a wave shaped surface, as seen in a longitudinal sectional view.

In this way an optimal sealing result is obtained between the wall of the bore hole and the sealing body, as the annular strips, having the greatest external cross section, may expand in the direction of a recess or valley between two strips.

The sealing body comprises three rounded crests, separated from one another by means of wave shaped valleys.

The external side of the sealing body includes an electrically conducting surface layer, which is conductively connected with an electric charge disposing means.

In another embodiment the plastic pipe of the invention is provided with a socket end and comprises a sealing body in the vicinity of the pipe end opposite to the socket end, while the sealing body proper is arranged in the vicinity of the free end region of the plastic pipe.

The result of the above is that an optimal sealing is produced and moreover a simple centering, at the time when the pipe is pushed into the bore hole.

SURVEY OF THE DRAWINGS

FIG. 1 shows a longitudinal sectional view of a plastic pipe according to the invention;

FIG. 2 a cross section according to line II—II in FIG. 1;

FIG. 3 a longitudinal sectional view through another embodiment of a pipe according to the invention;

FIG. 4 a longitudinal sectional view of a plastic pipe according to the invention when being pushed into a bore hole; and FIG. 5 a longitudinal sectional view of an embodiment of a plastic pipe of the invention according to FIG. 3.

DESCRIPTION OF PREFERRED EMBODIMENTS

Figures 1, 2:
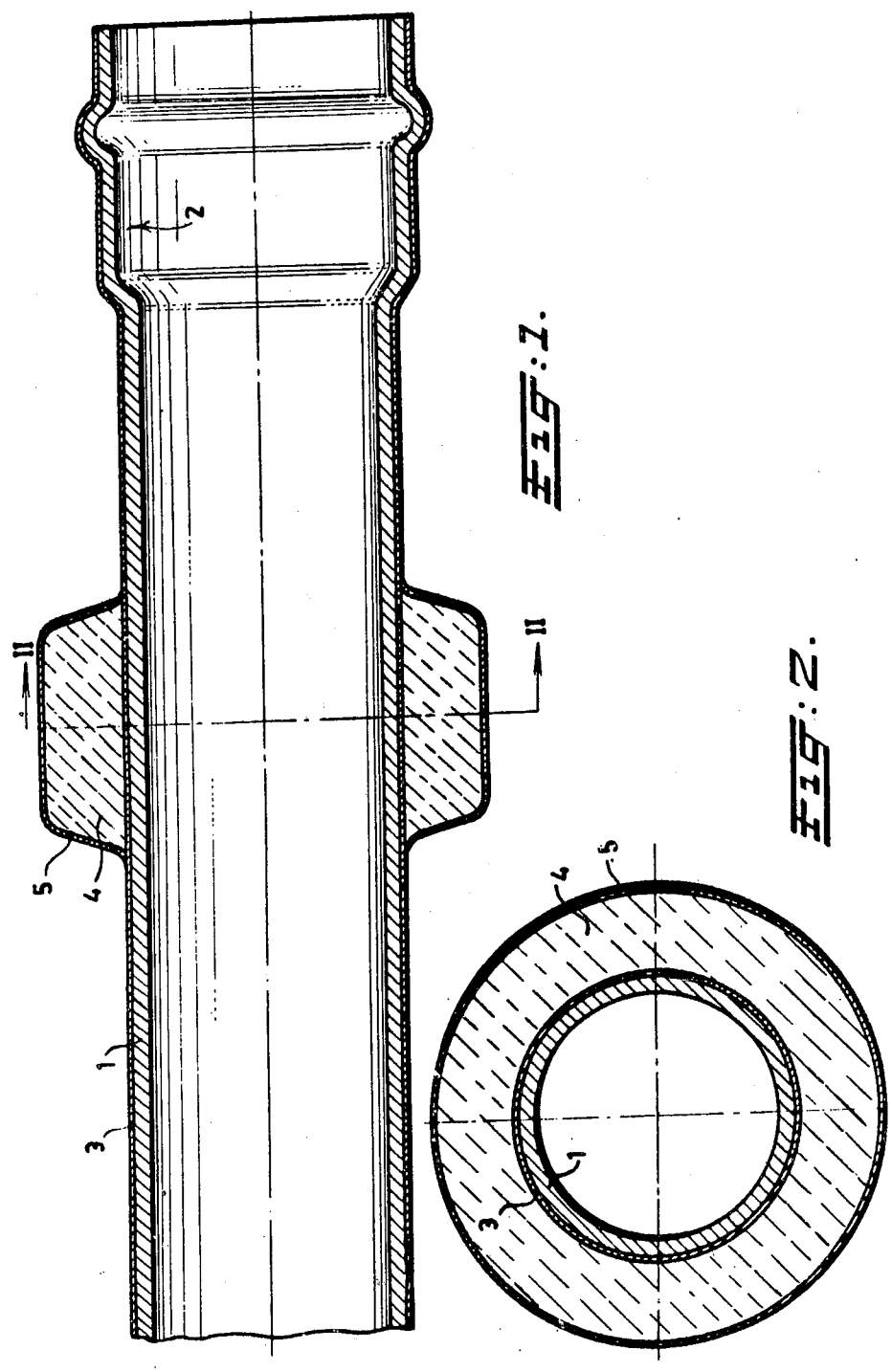

The drawing shows a plastic pipe 1 of polyvinylchloride with a socket end 2, coated with an electrically conducting surface layer 3, consisting of a modified thermosetting resin, for instance an epoxy resin, with soot particles.

The surface coating layer 3 is obtained by immersion of the pipe into a liquid resin composition containing conducting particles, which composition may be diluted by means of a solvent. A suitable modified epoxy resin composition with soot particles for forming such a surface layer is manufactured by Messrs. Bostik GmbH, Ober-Ursel, under the trade name Finch 453-1-1-Modified Epoxy Resin.

The plastic pipe 1 is provided on its outside with a sealing body 4 of polyurethane foam plastic having a closed or porefree surface layer or skin 5, positioned in the vicinity of the end of the pipe opposite the socket end 2. As shown in the drawing the outside of the sealing body is wave shaped, as seen in a longitudinal sectional view (FIGS. 3–5) and comprises three wave-shaped annular crests 6, 6a, 6b which are separated from each other by means of wave shaped valleys or recesses 7, 8.

The resilient sealing body 4 is obtained by surrounding a part of the electrically conducting surface layer 3 of the plastic pipe 1 by a hollow mold while into the hollow space of the mold a polyurethane composition is foamed, the temperature of the mold being selected such that the integral closed layer or skin 5 is produced on the one hand, while on the other hand the electrically conducting layer 3 comprising a thermosetting resin, ensures a very good connection of the resilient polyurethane foam and the pipe 1.

The thermosetting resin used for forming an electrically conducting surface layer 3 is modified so that same adheres to the external side of a polyvinylchloride pipe, in a very satisfactory manner.

In view of the important adhering properties of the closed layer 5, the plastic pipe can be slid directly into the bore hole 9 of the coal stratum 10, without any special provisions being required. The resilient sealing body 4 engages at that time the wall of the bore hole 9 in a sealing manner.

In order to obtain an electrically conducting sealing body 4, a polyurethane mixture containing soot particles can be foamed.

A fabric 11 soaked in a thermosetting resin composition containing soot particles may be also wound around the sealing body 4; the ends of the fabric may extend onto the surface layer 3 of the pipe, in order to produce a conductive connection (see FIG. 5).

It goes without saying that the sealing body can also be laquered with a thermosetting resin composition containing soot particles, in order to obtain a conducting surface layer.

What is claimed is:

1. A thermoplastic pipe provided with an electrically conducting surface layer of thermosetting resin adhering to the thermoplastic pipe, and at least one resilient sealing body which has been foamed onto the electrically conducting surface layer, said sealing body containing electrically conducting particles.

2. The pipe as defined in claim 1, wherein the outer side of the sealing body is provided with an electrically conducting surface layer.

3. The pipe as defined in claim 1, comprising two electrically conducting sealing bodies, positioned in the vicinity of a free pipe end and separated from each other.

4. The pipe as defined in claim 1, the external side of which supports at least a longitudinal sealing body of a resilient thermosetting material, a sectional longitudinal view of said body showing wave shaped surfaces.

5. The pipe as defined in claim 1, wherein the sealing body has two rounded annular crests, separated from each other by means of a wave shaped valley.

6. The pipe as defined in claim 4, wherein the sealing body has three rounded annular crests, separated from each other by means of wave shaped valleys.

7. The pipe as defined in claim 1 wherein the external side of the sealing body is covered with a fabric, soaked in a thermosetting setting resin with soot particles.

8. The pipe as defined in claim 1, wherein the external side of the sealing body is covered with a thermosetting resin layer comprising soot particles.

* * * * *